United States Patent
Rao et al.

(10) Patent No.: US 11,500,814 B1
(45) Date of Patent: *Nov. 15, 2022

(54) CHAIN FILE SYSTEM

(71) Applicant: Portworx, Inc., Los Altos, CA (US)

(72) Inventors: Goutham Rao, Los Altos, CA (US); Vinod Jayaraman, San Francisco, CA (US)

(73) Assignee: Pure Storage, Inc., Mountain View, CA (US)

(*) Notice: Subject to any disclaimer, the term of this patent is extended or adjusted under 35 U.S.C. 154(b) by 65 days.

This patent is subject to a terminal disclaimer.

(21) Appl. No.: 17/089,689

(22) Filed: Nov. 4, 2020

Related U.S. Application Data

(63) Continuation of application No. 16/011,859, filed on Jun. 19, 2018, now Pat. No. 10,838,914, which is a
(Continued)

(51) Int. Cl.
*G06F 16/13* (2019.01)
*G06F 21/62* (2013.01)
(Continued)

(52) U.S. Cl.
CPC ............ *G06F 16/13* (2019.01); *G06F 16/128* (2019.01); *G06F 16/188* (2019.01); *G06F 21/53* (2013.01); *G06F 21/6218* (2013.01)

(58) Field of Classification Search
CPC ...... G06F 16/13; G06F 16/128; G06F 16/188; G06F 21/6218; G06F 21/53
(Continued)

(56) References Cited

U.S. PATENT DOCUMENTS

| | | | |
|---|---|---|---|
| 5,239,647 | A | 8/1993 | Anglin et al. |
| 7,107,385 | B2 | 9/2006 | Rajan et al. |

(Continued)

FOREIGN PATENT DOCUMENTS

| | | |
|---|---|---|
| WO | 2011022388 A1 | 2/2011 |
| WO | 2016134035 A1 | 8/2016 |

OTHER PUBLICATIONS

Bisson, Tim, et al., "Designing a Fast File System Crawler with Incremental Differencing", ACM SIGOPS Operating Systems Review, vol. 46, No. 3, Dec. 2012, pp. 11-19.*

(Continued)

*Primary Examiner* — Robert Stevens
(74) *Attorney, Agent, or Firm* — ALG Intellectual Property, LLC

(57) ABSTRACT

Techniques and mechanisms described herein facilitate the execution of a software program container having a plurality of layers. Each layer may include a plurality of files. For instance, a base layer may include a version of an operating system, while an upper layer may include a software program configured to run within the operating system. Different layers may store, create, or modify the same file. However, the precedence of the version of the data for the file may be based on an ordering of the layers. For example, the version of the file in a higher layer should supersede the version of the file in a lower layer. In some implementations, a privileged storage container that runs atop a virtualization layer may manage storage resources for other containers. The privileged storage container may store each file in a software program container as a snapshotable object.

20 Claims, 8 Drawing Sheets

Related U.S. Application Data continuation of application No. 15/173,549, filed on Jun. 3, 2016, now Pat. No. 10,025,790.

(51) Int. Cl.
  *G06F 16/11* (2019.01)
  *G06F 16/188* (2019.01)
  *G06F 21/53* (2013.01)

(58) Field of Classification Search
  USPC .......................................................... 707/822
  See application file for complete search history.

(56) References Cited

U.S. PATENT DOCUMENTS

| | | | |
|---|---|---|---|
| 7,584,227 | B2 | 9/2009 | Gokhale et al. |
| 7,739,312 | B2 | 6/2010 | Gordon et al. |
| 7,945,726 | B2 | 5/2011 | Faibish et al. |
| 8,166,260 | B2 | 4/2012 | Prabhu et al. |
| 8,595,191 | B2 | 11/2013 | Prahlad et al. |
| 8,600,998 | B1 | 12/2013 | Chaudhary et al. |
| 8,996,490 | B1 | 3/2015 | Armangau et al. |
| 9,886,213 | B2 | 2/2018 | Sivasubramanian et al. |
| 10,025,790 | B2 | 7/2018 | Rao et al. |
| 10,838,914 | B2 | 11/2020 | Rao et al. |
| 2005/0044162 | A1 | 2/2005 | Liang et al. |
| 2005/0065986 | A1 | 3/2005 | Bixby et al. |
| 2006/0218135 | A1 | 9/2006 | Bisson et al. |
| 2007/0260830 | A1 | 11/2007 | Faibish et al. |
| 2008/0005468 | A1 | 1/2008 | Faibish et al. |
| 2010/0058010 | A1* | 3/2010 | Augenstein .......... G06F 11/1451 711/E12.103 |
| 2011/0040812 | A1 | 2/2011 | Phillips |
| 2011/0061045 | A1 | 3/2011 | Phillips |
| 2014/0136483 | A1 | 5/2014 | Chaudhary et al. |
| 2016/0259955 | A1 | 9/2016 | Berlin et al. |
| 2017/0103000 | A1 | 4/2017 | Iyengar et al. |
| 2017/0235649 | A1 | 8/2017 | Shah et al. |
| 2017/0351695 | A1 | 12/2017 | Rao et al. |

OTHER PUBLICATIONS

U.S. Appl. No. 16/011,859, Non-Final Rejection, dated Apr. 16, 2020, 6 pgs.

U.S. Appl. No. 16/011,859, Notice Of Allowance And Fees Due (Ptol-85), dated Jul. 31, 2020, 7 pgs.

U.S. Appl. No. 15/173,549, Notice of Allowance dated Apr. 4, 2018, 11 pages.

Braam, Peter J.., et al., Lustre Technical Project Summary, Cluster File Systems, Inc., Lustre Technical Project Summary (Attachment A to RFP B514193 Response) Version 2, Jul. 29, 2001, 32 pages.

Harter, Tyler, et al., "Slacker: Fast Distribution with Lazy Docker Containers", FAST '16, Santa Clara, CA, Feb. 22-25, 2016, pp. 181-195.

* cited by examiner

CHAIN FILE SYSTEM

CROSS-REFERENCE TO RELATED APPLICATIONS

The present application is a continuation of, and claims priority to, U.S. patent application Ser. No. 16/011,859 by Goutham Rao and Vinod Jayaraman, filed Jun. 19, 2018, which is a continuation of U.S. patent application Ser. No. 15/173,549 by Goutham Rao and Vinod Jayaraman, filed Jun. 3, 2016, which is incorporated herein by reference in its entirety and for all purposes.

TECHNICAL FIELD

The present disclosure relates generally to containerized applications and more specifically to containerized scalable storage applications.

DESCRIPTION OF RELATED ART

One of the most difficult challenges facing software developers is interoperability of software between different computing environments. Software written to run in one operating system typically will not run without modification in a different operating system. Even within the same operating system, a software program may rely on other programs in order to function. Each of these dependencies may or may not be available on any given system, or may be available but in a version different from the version originally relied upon. Thus, dependency relationships further complicate efforts to create software capable of running in different environments.

In recent years, the introduction of operating-system-level virtualization has facilitated the development of containerized software applications. A system configured with operating-system-level virtualization includes a container engine that operates on top of the operating system. Importantly, the container engine is configured to operate interchangeably in different environments (e.g., with different operating systems). At the same time, the container engine is configured to present a standardized interface to one or more software containers.

Each software container may include computer programming code for performing one or more tasks. Examples of software containers include web servers, email servers, web applications, and other such programs. Each software container may include some or all of the software resources that the software in the container needs in order to function. For example, if a software container includes a web application written in the Python programming language, the software container may also include the Python programming language modules that the web application relies upon. In this way, the software container may be installed and may execute successfully in different computing environments as long as the computing environment includes a container engine.

BRIEF SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

According to various embodiments, instructions for implementing a containerized application may be retrieved from a storage device. The instructions may be arranged in a plurality of layers ordered from lowest to highest. Each layer may include a respective plurality of files, and a file may be capable of being included in more than one of the layers. Each layer may be loaded into memory, which may involve creating a file snapshot and a file inode number for each file in the layer that is either not present in a lower level layer or that is present in a lower level layer but modified by the designated layer. The file snapshot may include one or more data blocks, each of which may include data that is additional to or different than any data associated with the file in a lower level layer. The file inode number may provide a unique identifier for accessing the file and may correspond to the file snapshot. The containerized application may be executed when it is loaded into memory.

According to various embodiments, the layers may be loaded into memory in order from lowest to highest. The file snapshot may be created by a privileged storage container that has access to the storage device. Executing the containerized application may include writing to a designated file within one of the layers.

According to various embodiments, writing to the designated file may involve identifying an inode associated with the designated file and identifying a snapshot associated with the inode. Data may be written to one or more designated data blocks, and the identified snapshot may be updated to include the one or more designated data blocks.

In particular embodiments, the layers may include a first layer and a second layer at the same level. The lowest layer may include files that together implement an operating system.

In particular embodiments, the privileged storage container may facilitate communication among a plurality of storage container nodes, each of which is implemented on a respective computing device. The storage container nodes may be operable to distribute data among the computing devices. A request for data may be received at a first one of the storage container nodes and transmitted to a second one of the storage container nodes that includes data for responding to the request.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
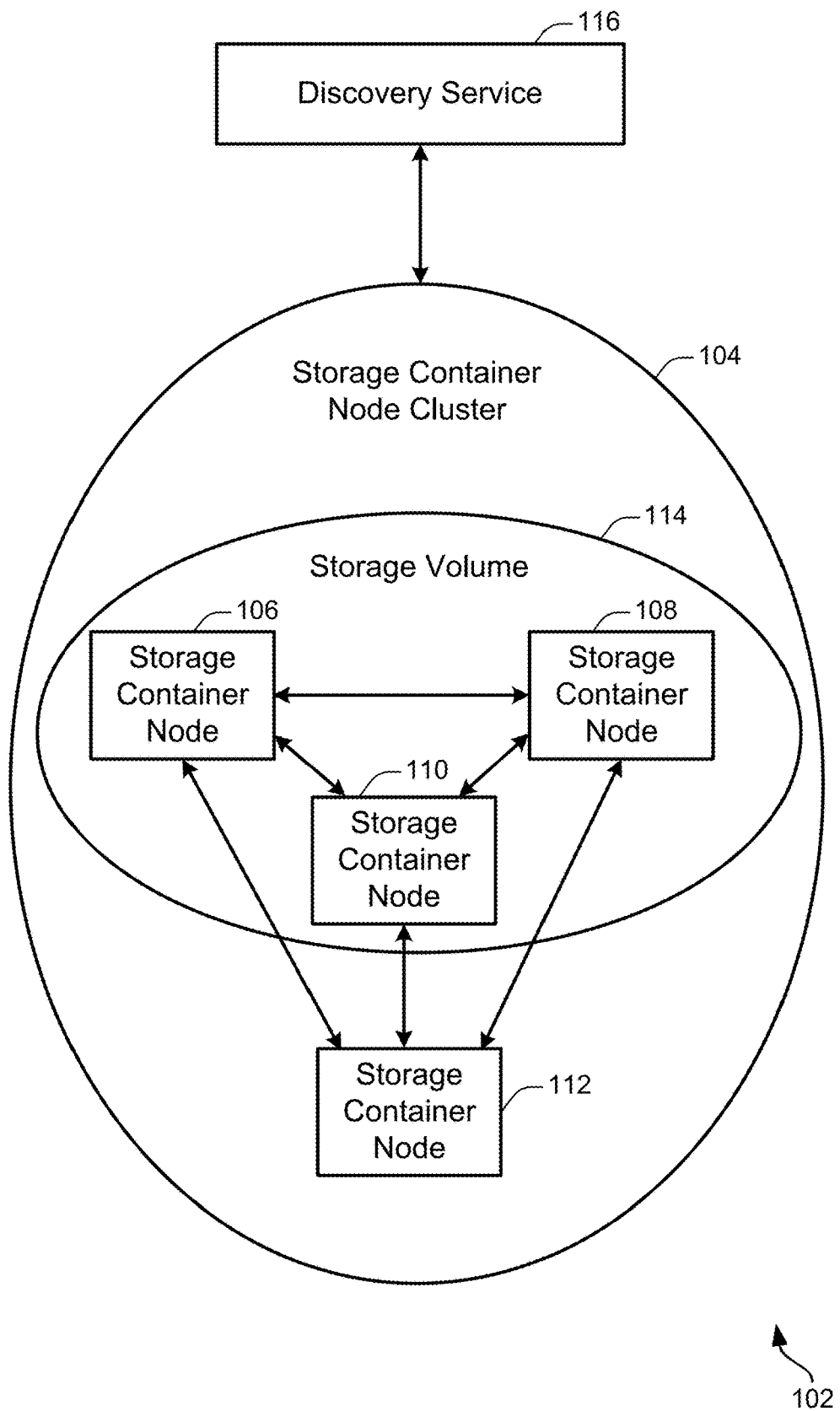
FIG. 1 illustrates an example of a scalable storage container node system, configured in accordance with one or more embodiments.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise Overview According to various embodiments, techniques and mechanisms described herein may facilitate the execution of a software program container having a plurality of layers. Each layer may include a plurality of files. For instance, a base layer may include a version of an operating system, while an upper layer may include a software program configured to run within the operating system. Different layers may store, create, or modify the same file. However, the precedence of the version of the data for the file may be based on an ordering of the layers. For example, the version of the file in a higher layer should supersede the version of the file in a lower layer. In some implementations, a privileged storage container that runs atop a virtualization layer may manage storage resources for other containers. The privileged storage container may store each file in a software program container as a snapshotable object. Snapshots may be constructed at the data block level so that a snapshot of a file at an upper level layer need only include the data blocks that are different as compared to lower level layer. Then, a version of the file for the upper level layer may be constructed by overlaying the upper level snapshot on the lower level snapshot.

EXAMPLE EMBODIMENTS

Techniques and mechanisms described herein may facilitate the configuration of a scalable storage container node system. In some embodiments, a scalable storage container node system may allow application containers in a virtualized application system to quickly and directly provision and scale storage. Further, the system may be configured to provide one or more user experience guarantees across classes of applications.

According to various embodiments, the system may pool the capacity of different services into virtual storage volumes and auto-allocate storage as application storage traffic scales or bursts. For instance, a single virtual storage volume may include hundreds or thousands of terabytes of storage space aggregated across many different storage devices located on many different physical machines.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments.

In some implementations, storage volumes created according to the techniques and mechanisms described herein may be highly failure-tolerant. For example, a virtual storage volume may include data stored on potentially many different storage nodes. A storage node may fail for any of various reasons, such as hardware failure, network failure, software failure, or server maintenance. Data integrity may be maintained even if one or more nodes that make up a storage volume fail during data storage operations.

An application container is frequently constructed as a series of two or more layers. Each layer may include some number of files. For instance, an application container may include an operating system such as a Linux distribution as a base layer. Then, the application container may include additional layers, such as a MySQL layer and an Nginx layer, that each rely on the files included in the base layer.

Organizing files into layers may facilitate the separation of an application container into more granular components. In some embodiments, a layer may take the form of a tar archive, also known as a tarball. Alternately, a layer may take the form of any other file aggregation mechanism, such as a zip file or a folder of files. Thus, a container may be modified by replacing a single layer with a new version, without having to distribute a new copy of the entire container.

When an application container is loaded into memory for execution, the layers may need to be combined in some way in order to function together. For example, files from a MySQL layer may be combined in memory with files from a base operating system layer to create a functioning whole. The software that unifies layers into a functioning whole may be referred to as an image layer storage driver.

When employing conventional techniques, conflicts may arise if different layers include different versions of the same file. For example, an upper layer may either include a different version of the same file in a lower layer prior to being loaded into memory. As another example, an upper layer may write to a file in a lower layer after the layers have all been loaded into memory for execution. Conventional techniques to merging layers into a unified whole and addressing these potential conflicts include two approaches.

The first conventional technique is referred to as an overlay approach. Examples of union file systems are OverlayFS and UnionFS. A union file system combines the different layers to present a virtualized namespace. A union file system employs a copy-on-write technique. When an upper layer writes to a file that already exists in a lower layer, the image layer storage driver creates a new copy of the file. The file in the lower layer is not modified directly because other layers may reference the same file.

Union file systems may exhibit several drawbacks, which may include, but are not limited to: inode proliferation, incorrect file semantics (e.g., locking), memory consumption, and reloading the same file from disk more than once. Several specific examples of drawbacks are described below. First, union file systems incur a performance penalty and a disk usage penalty by copying an entire file from a lower layer when an upper layer writes to that file, even if the data that is written is a small portion of the overall file size.

Second, union file systems create problems with Inotify. Inotify (inode notify) is a Linux kernel subsystem that acts to extend filesystems to notice changes to the filesystem, and report those changes to applications. If writing to a file creates a new copy of that file, then the creation or editing of the new version of the file does not trigger a notification under Inotify, which may create a loss of functionality that breaks some applications.

Third, union file systems create inode proliferation. In a non-containerized application, two applications writing to the same file will access the file via the same inode. In this way, data written to the file by one application can be read from the file by the other application. However, the union file system approach of copying the file upon a write to the file generates a new inode for the copy. Therefore, if the base layer subsequently writes to the copy of the file, the upper layer that has copied the file will not be accessing the file with the same inode as the lower layer and thus will not be able to read the changes written by the base layer. Inode proliferation also means that a file may not be locked for the purpose of serializing reads and writes of the file and preventing conflicts or race conditions between different applications.

A second conventional technique for constructing an image layer storage driver is a snapshot approach. Under a snapshot approach, the image layer storage driver creates a block-wise snapshot for each subsequent layer. Each file stored in a storage system is composed of some number of data blocks. A snapshot of an upper layer may include only data blocks associated with files that the upper layer has added or data blocks associated with changes that the upper layer has made to files in the lower layer. The snapshot of the base layer may thus include all of the data in the base layer, while the snapshot of the upper layer may include a relatively limited amount of data that makes up the additions and changes provided by the upper layer. The image layer storage driver may load the upper layer into memory by first loading the snapshot associated with the base layer and then loading on top the snapshot associated with the upper layer.

Snapshot file systems typically provide relatively efficient usage of disk space but may exhibit several drawbacks. For example, snapshot file systems may exhibit inefficient usage of memory. If a container includes two different upper level layers, then a snapshot file system may load a complete snapshot of the base layer for each of the upper level layers.

For example, the base layer of a container may include an operating system, a snapshot of which may require 10 gb to represent in memory. If the container includes two upper level layers that are associated with different snapshots that each require 1 gb to represent in memory, then loading both upper level layers into memory would require 11 gb (10 gb for the base layer and 1 gb for the upper layer) for a total of 22 gb of memory usage. In addition to being an inefficient usage of memory due to loading the base layer twice, the snapshot file system approach requires reading the base layer twice from disk, thus also incurring a performance penalty in loading the layers.

According to various embodiments, techniques and mechanisms described herein provide for a chain image layer storage driver. A chain image layer storage driver may provide many of the advantages of union file systems such as memory efficiency, as well as the advantages of snapshot file systems such as disk efficiency, without many of the associated drawbacks.

FIG. 1 illustrates an example of a scalable storage container node system 102. In some embodiments, the scalable storage container node system 102 may be capable of providing storage operations within the context of one or more servers configured to implement a container system. The scalable storage container node system 102 includes a storage container node cluster 104, which includes storage container nodes 106, 108, 110, and 112. The storage container nodes 106, 108, and 110 are combined to form a storage volume 114. The scalable storage container node system 102 also includes a discovery service 116.

At 104, the storage container node cluster 104 is shown. According to various embodiments, a storage container node cluster may include one or more storage container nodes collectively configured to aggregate and abstract storage resources for the purpose of performing storage-related operations. Although the scalable storage container node system 102 shows only a single storage container node cluster, implementations of the techniques discussed herein may frequently include thousands or millions of storage container node clusters in a scalable storage container node system.

At 106, 108, 110, and 112, storage container nodes are shown. A storage container node may be configured as discussed with respect to the storage container node 102 shown in FIG. 102 or may be arranged in a different configuration. Each storage container node may include one or more privileged storage container such as the privileged storage container 116 shown in FIG. 1.

According to various embodiments, storage container nodes may be configured to aggregate storage resources to create a storage volume that spans more than one storage container node. By creating such a storage volume, storage resources such as physical disk drives that are located at different physical servers may be combined to create a virtual volume that spans more than one physical server.

The storage volume may be used for any suitable storage operations by other applications. For example, the containers 210, 212, and/or 214 shown in FIG. 2 may use the storage volume for storing or retrieving data. As another example, other applications that do not exist as containers may use the storage volume for storage operations.

Figure 2:
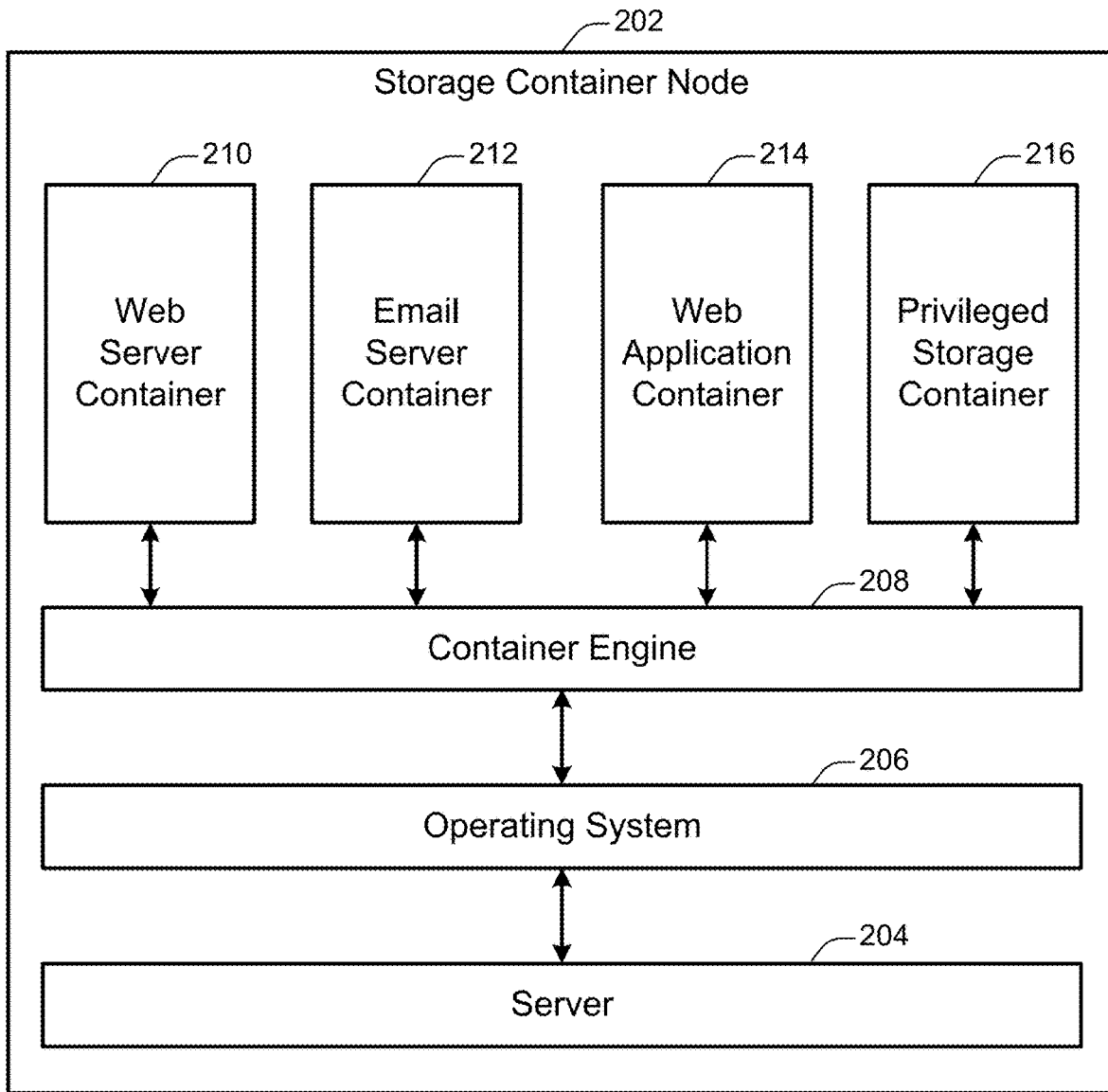
FIG. 2 illustrates an example of a storage container node, configured in accordance with one or more embodiments.

In some implementations, the storage volume may be accessible to an application through a container engine, as discussed with respect to FIG. 2. For instance, a privileged storage container located at the storage container node 106 may receive a request to perform a storage operation on a storage volume that spans multiple storage nodes, such as the nodes 106, 108, 110, and 112 shown in FIG. 1. The privileged storage container may then coordinate communication as necessary among the other storage container nodes in the cluster and/or the discovery service 116 to execute the storage request.

At 114, a storage volume is shown. According to various embodiments, a storage volume may act as a logical storage device for storing and retrieving data. The storage volume 114 includes the storage container nodes 106, 108, and 110. However, storage volumes may be configured to include various numbers of storage container nodes. A storage volume may aggregate storage resources available on its constituent nodes. For example, if each of the storage container nodes 106, 108, and 110 include 2 terabytes of physical data storage, then the storage volume 114 may be configured to include 6 terabytes of physical data storage.

In some implementations, a storage volume may provide access to data storage for one or more applications. For example, a software application running on any of storage container nodes 106-112 may store data to and/or retrieve data from the storage volume 114. As another example, the storage volume 114 may be used to store data for an application running on a server not shown in FIG. 1.

At 116, a discovery service is shown. According to various embodiments, the discovery service may be configured to coordinate one or more activities involving storage container node clusters and/or storage container nodes. For example, the discovery service may be configured to initialize a new storage container node cluster, destroy an existing storage container node cluster, add or remove a storage container node from a storage container node cluster, identify which node or nodes in a storage container node cluster are associated with a designated storage volume, and/or identify the capacity of a designated storage volume.

In some implementations, a discovery service may be configured to add a storage container node to a storage container node cluster. An example of such a method is described in additional detail with respect to FIG. 4. In some implementations, a discovery service may be configured to facilitate the execution of a storage request.

According to various embodiments, the discovery service may be configured in any way suitable for performing coordination activities. For instance, the discovery service may be implemented as a distributed database divided among a number of different discovery service node. The discovery service may include a metadata server that store information such as which storage container nodes correspond to which storage container node clusters and/or which data is stored on which storage container node. Alternately, or additionally, the metadata server may store information such as which storage container nodes are included in a storage volume.

FIG. 2 illustrates an example of a storage container node 202. According to various embodiments, a storage container node may be a server configured to include a container engine and a privileged storage container. The storage container node 202 shown in FIG. 2 includes a server layer 204, an operating system layer 206, a container engine 208, a web server container 210, an email server container 212, a web application container 214, and a privileged storage container 216.

In some embodiments, the storage container node 202 may serve as an interface between storage resources available at a server instance and one or more virtual storage volumes that span more than one physical and/or virtual server. For example, the storage container node 202 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

At 204, the server layer is shown. According to various embodiments, the server layer may function as an interface by which the operating system 206 interacts with the server on which the storage container node 202 is implemented. A storage container node may be implemented on a virtual or physical server. For example, the storage container node 202 may be implemented at least in part on the server shown in FIG. 5. The server may include hardware such as networking components, memory, physical storage devices, and other such infrastructure. The operating system layer 206 may communicate with these devices through a standardized interface provided by the server layer 204.

At 206, the operating system layer is shown. According to various embodiments, different computing environments may employ different operating system layers. For instance, a physical or virtual server environment may include an operating system based on Microsoft Windows, Linux, or Apple's OS X. The operating system layer 206 may provide, among other functionality, a standardized interface for communicating with the server layer 204.

At 208, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 204, an operating system layer 206, and a container engine layer 208 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 202 includes the web server container 220, the email server container 212, and the web application container 214. A software container may include customized computer code configured to perform any of various tasks. For instance, the web server container 220 may provide files such as webpages to client machines upon request. The email server 212 may handle the receipt and transmission of emails as well as requests by client devices to access those emails. The web application container 214 may be configured to execute any type of web application, such as an instant messaging service, an online auction, a wiki, or a webmail service. Although that storage container node 202 shown in FIG. 2 includes three software containers, other storage container nodes may include various numbers and types of software containers.

At 216, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 220, 212, and 214 or other software containers located in different computing environments. For example, a software container may transmit a storage request to the container engine 208 via a standardized interface. The container engine 208 may transmit the storage request to the privileged storage container 216. The privileged storage container 216 may then communicate with privileged storage containers located on other storage container nodes and/or may communicate with hardware resources located at the storage container node 202 to execute the request.

In some implementations, one or more software containers may be afforded limited permissions in the computing environment in which they are located. For example, in order to facilitate a containerized software environment, the software containers 220, 212, and 214 may be restricted to communicating directly only with the container engine 208 via a standardized interface. The container engine 208 may then be responsible for relaying communications as necessary to other software containers and/or the operating system layer 206.

In some implementations, the privileged storage container 216 may be afforded additional privileges beyond those afforded to ordinary software containers. For example, the privileged storage container 216 may be allowed to communicate directly with the operating system layer 206, the server layer 204, and/or one or more physical hardware components such as physical storage devices. Providing the storage container 216 with expanded privileges may facilitate efficient storage operations such as storing, retrieving, and indexing data.

Figure 3:
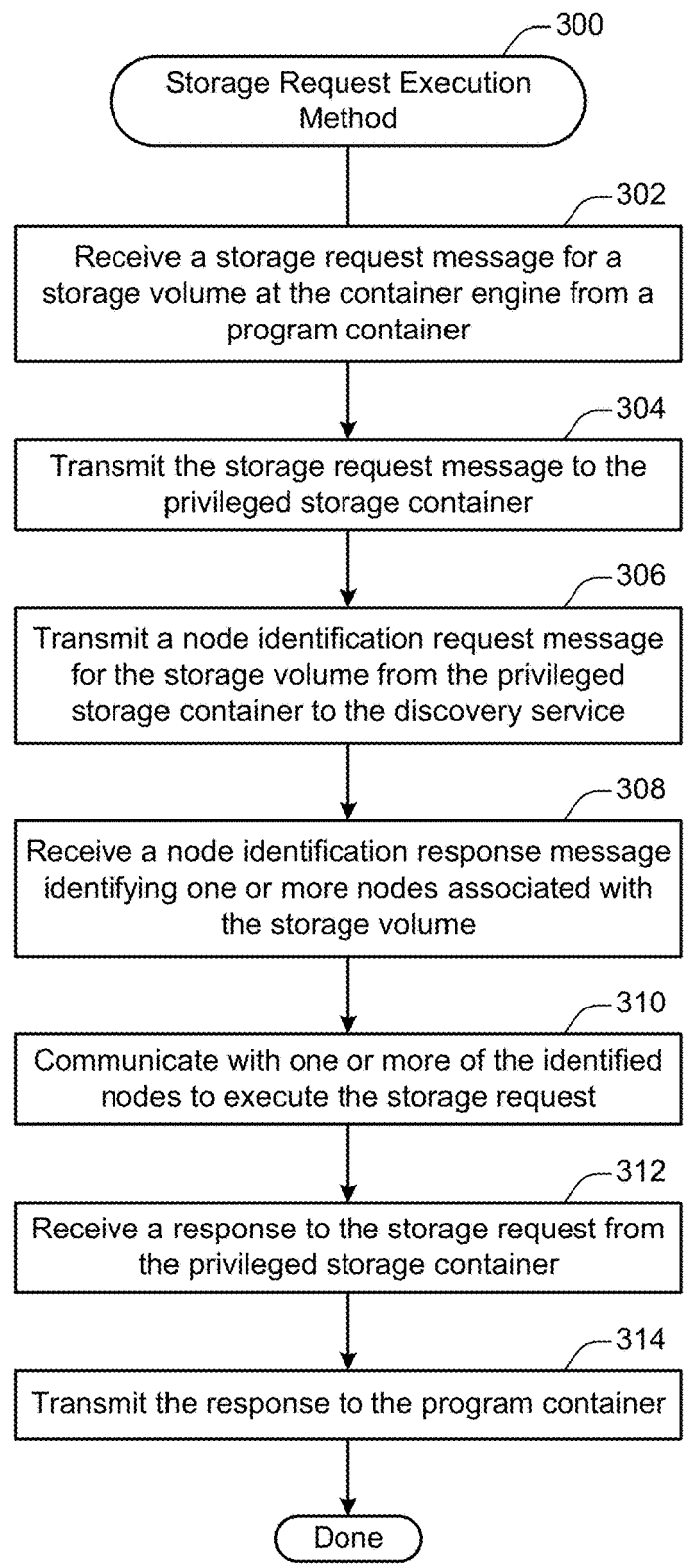
FIG. 3 illustrates an example of a method for executing a storage request.

FIG. 3 illustrates an example of a method 300 for executing a storage request among components of a storage container node, performed in accordance with one or more embodiments. For example, the method 300 may be performed at a storage container node such as the node 202 shown in FIG. 2.

At 302, a storage request message for a data volume is received at the container engine from a program container. In some implementations, the storage request message may be received at the container engine 208 shown in FIG. 1 from any of the containers 210, 212, or 214 or any other program container.

According to various embodiments, the storage request message may include any request related to a data storage operation. For instance, the storage request may include a request to retrieve, store, index, characterize, or otherwise access data on a storage volume. The request may be transmitted from any container program configured to perform storage-related operations. For example, the web server container 210 shown in FIG. 2 may transmit a request to retrieve a file from a storage volume for the purpose of transmitting the file via a network. As another example, the email server container 212 may transmit a request to store a received email to a storage volume. As yet another example, the web application container 214 may transmit a request to identify the number and type of files in a folder on a storage volume.

At 304, the storage request is transmitted to the privileged storage container. For example, the container engine 208 may transmit the storage request to the privileged storage container 216 shown in FIG. 2.

According to various embodiments, the storage request may be received from the program container and/or transmitted to the privileged storage container via a standard API. For instance, the container engine 208 may support a standard storage API through which program containers may send and/or receive storage-related operations. Using a standard storage API may allow a program container to communicate interchangeably with different types of storage containers. Alternately, or additionally, using a standard storage API may allow a storage container to communicate interchangeably with different types of program containers.

At 306, a node identification request message is transmitted from the privileged storage container to the discovery service. In some implementations, the node identification request message may identify the storage volume associated with the storage request message. By communicating with the discovery service, the privileged storage container may identify which nodes in the cluster are associated with the storage volume.

At 308, a node identification response message is received at the privileged storage container from the discovery service. In some implementations, the node identification response message may identify one or more nodes associated with the storage volume. For example, if the privileged storage container located at the storage container node 112 shown in FIG. 1 transmitted a node identification request message to the discovery service identifying the storage volume 114, the node identification response message received from the discovery service may identify the storage container nodes 106, 108, and 110 shown in FIG. 1.

At 310, the privileged storage container may communicate with one or more of the identified nodes to execute the storage request. For example, the privileged storage container located at the storage container node 112 shown in FIG. 1 may access networking resources to communicate with one or more of the storage container nodes 106, 108, and 110. Communication may involve, for example, transmitting a file via the network to one or more of the nodes for storage.

In some instances, the privileged storage container may communicate with a single node. For instance, each node in the storage volume may be associated with a designated byte range or other subset of the data stored on the volume. The privileged storage container may then communicate with a particular storage container node to retrieve or store data that falls within the range of data associated with that node.

In some instances, the privileged storage container may communicate with more than one node. For example, the storage request may involve operations relating to data stored on more than one node. As another example, the storage volume may be configured for redundant data storage. In this case, executing a storage request to store data to the volume may involve transmitting storage messages to more than one volume.

At 312, a response to the storage request is received from the privileged storage container. At 314, the response is transmitted to the program container. According to various embodiments, the response may include any suitable information for responding to the storage request. For instance, the response may include a requested file, a confirmation message that data was stored successfully, or information characterizing data stored in a storage value.

In some implementations, the response may be received and requested in a manner similar to that discussed with respect to the receipt and transmission of the storage request discussed with respect to operations 302 and 304. For instance, the response may be received at the container engine 208 shown in FIG. 2 from the privileged storage container 216 and transmitted to the appropriate program container 210, 212, or 214.

Figure 4:
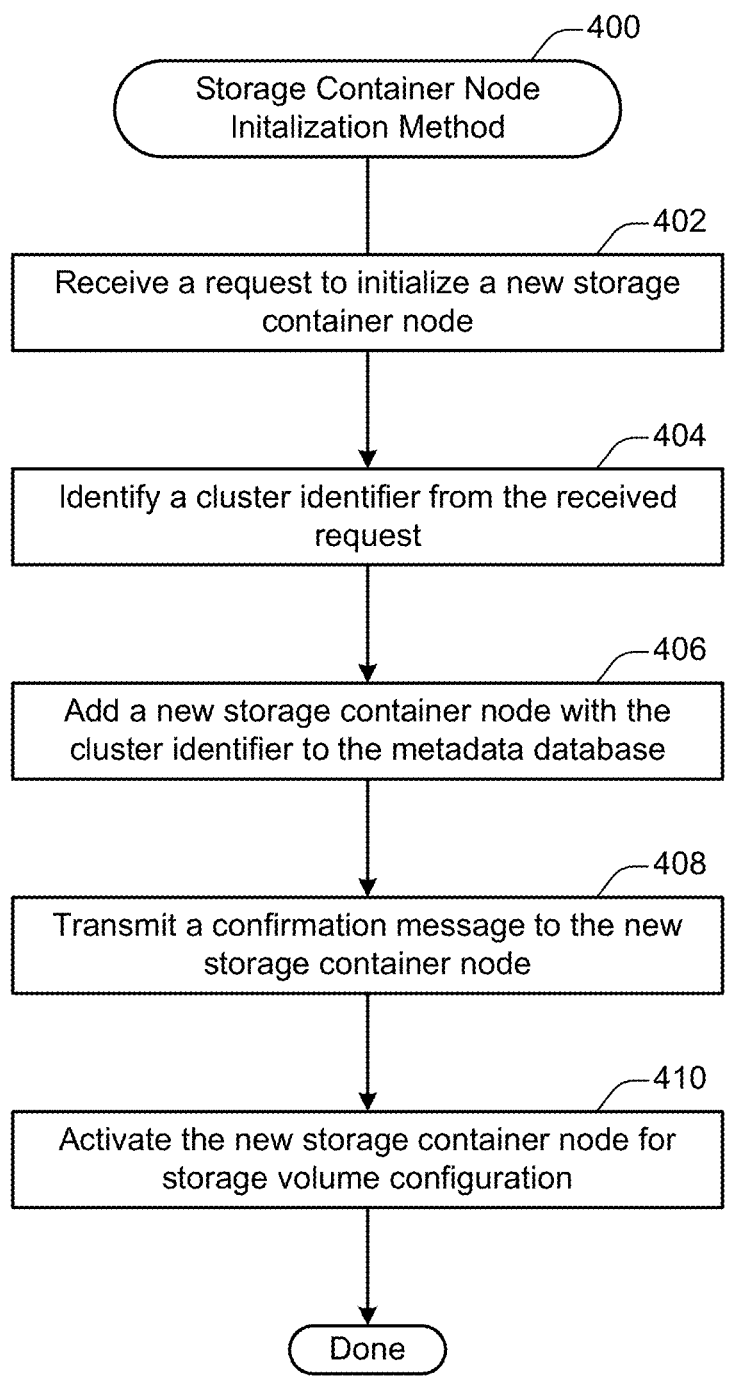
FIG. 4 illustrates an example of a method for initializing a new storage container node within a storage container node cluster.

FIG. 4 illustrates an example of a method 400 for initializing a new storage container node within a storage container node cluster, performed in accordance with one or more embodiments. The method 400 may be performed at a discovery service such as the discovery service 116 shown in FIG. 1.

At 402, a request to initialize a new storage container node is received. According to various embodiments, the request to initialize a new storage container node may be generated when a storage container node is activated. For instance, an administrator or configuration program may install a storage container on a server instance that includes a container engine to create a new storage container node. The administrator or configuration program may than provide a cluster identifier indicating a cluster to which the storage container node should be added. The storage container node may then communicate with the discovery service to complete the initialization.

At 404, a cluster identifier is identified from the received request. According to various embodiments, the cluster identifier may be included with the received request. Alternately, or additionally, a cluster identifier may be identified in another way, such as by consulting a configuration file.

At 406, a new storage container node with the cluster identifier is added to the metadata database. In some implementations, the metadata database may be implemented at the discovery service and may include various types of information for configuring the storage container node system. The metadata database may identify one or more clusters corresponding to each storage container node. For example, the metadata database may include a row of data that includes both the cluster identifier and an identifier specific to the new storage container node.

At 408, a confirmation message is transmitted to the new storage container node. According to various embodiments, the confirmation message may indicate to the new storage container node that initialization was successful and that the new storage container node is ready to be included in a storage container volume.

At 410, the new storage container node is activated for storage volume configuration. According to various embodiments, activating a storage container node for storage volume configuration may include responding to one or more requests to add the storage container node to a storage volume. For instance, an administrator or configuration program may transmit a request to the discovery service to add the new storage container node to a designated storage volume. The discovery service may then update configuration information in the metadata server to indicate that the designated storage volume includes the new storage container node. Then, the discovery service may direct subsequent requests involving the designated storage volume to the new storage container node or any other storage container node associated with the designated storage volume.

Figure 5:
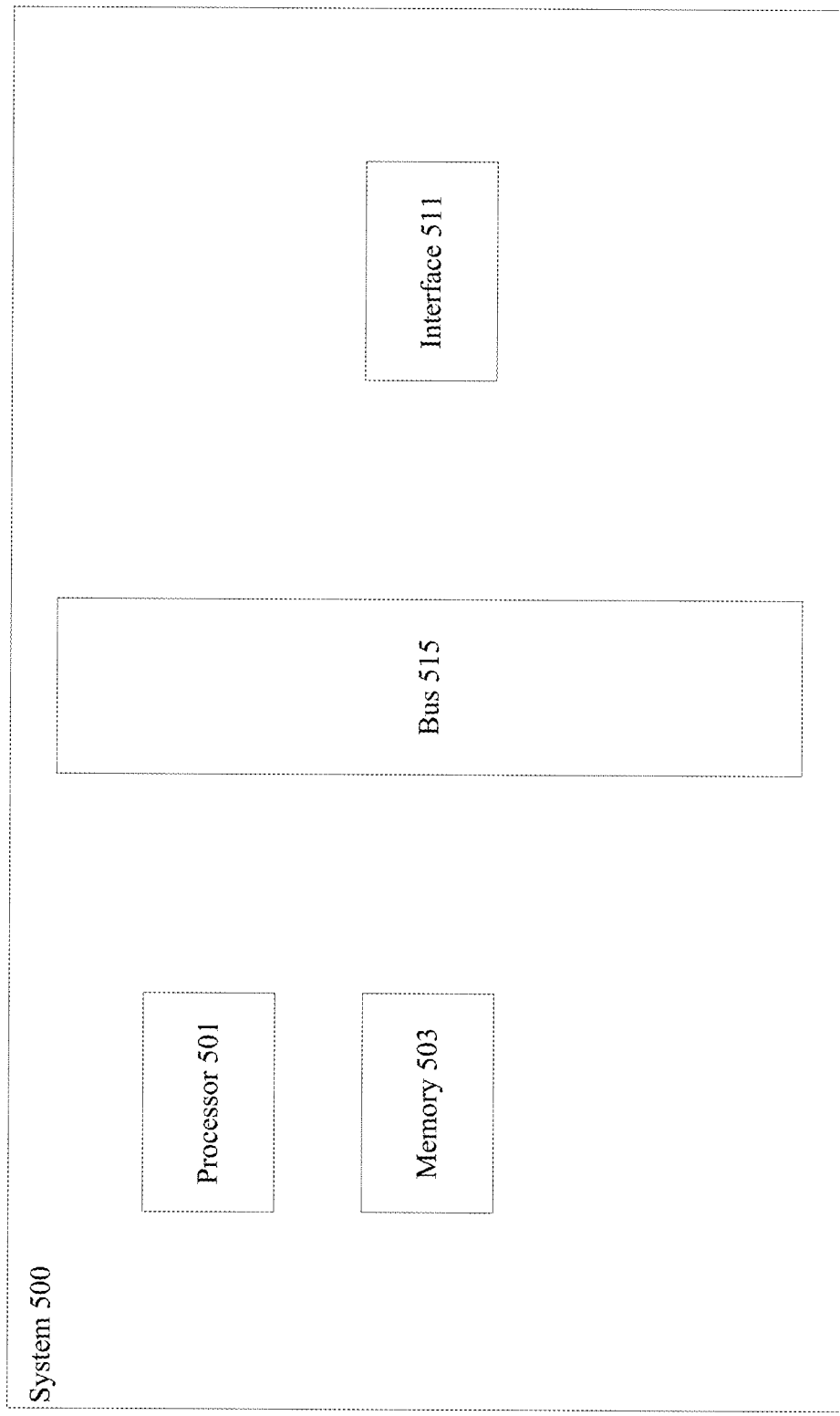
FIG. 5 illustrates an example of a server.

FIG. 5 illustrates one example of a server. According to particular embodiments, a system 500 suitable for implementing particular embodiments of the present invention includes a processor 501, a memory 503, an interface 511, and a bus 515 (e.g., a PCI bus or other interconnection fabric) and operates as a streaming server. When acting under the control of appropriate software or firmware, the processor 501 is responsible for modifying and transmitting live media data to a client. Various specially configured devices can also be used in place of a processor 501 or in addition to processor 501. The interface 511 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HS SI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 500 is a server configured to run a container engine. For example, the system 500 may be configured as a storage container node as shown in FIG. 1. The server may include one or more hardware elements as shown in FIG. 5. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

Figure 6:
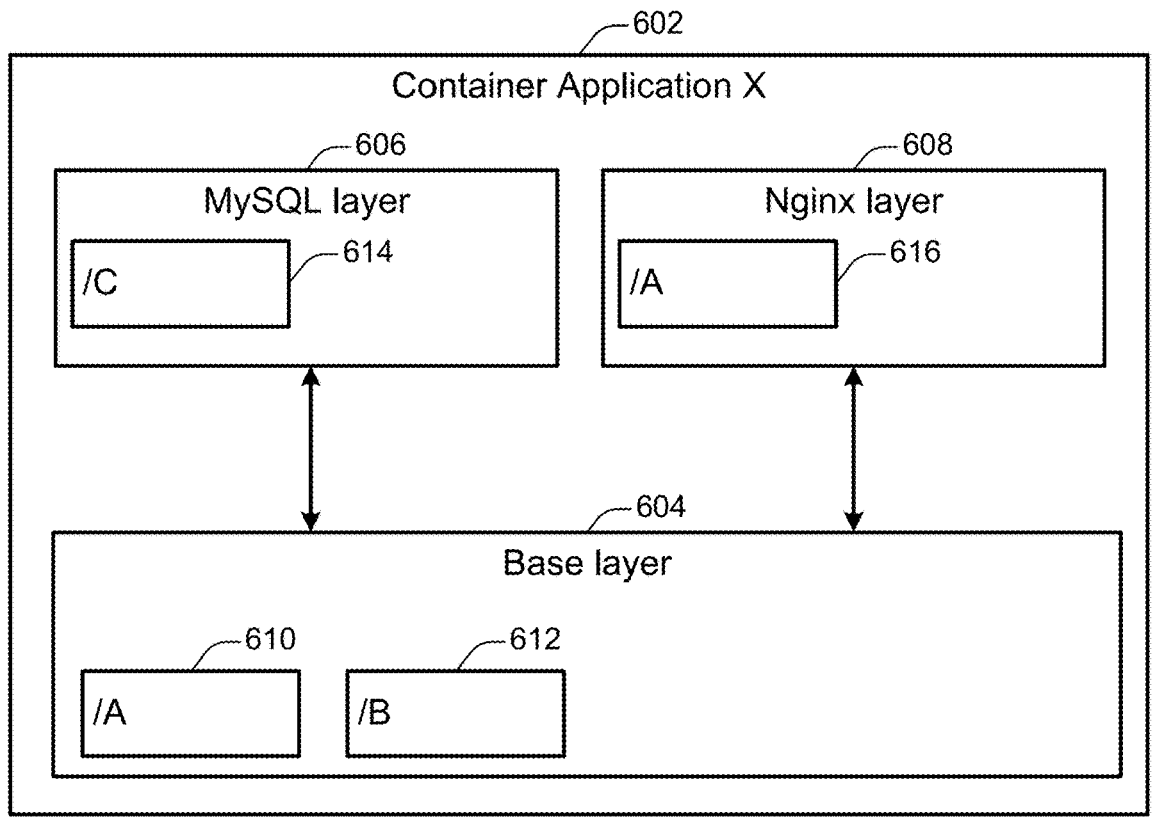
FIG. 6 illustrates an example of an arrangement of files in container applications.
Figure 6:
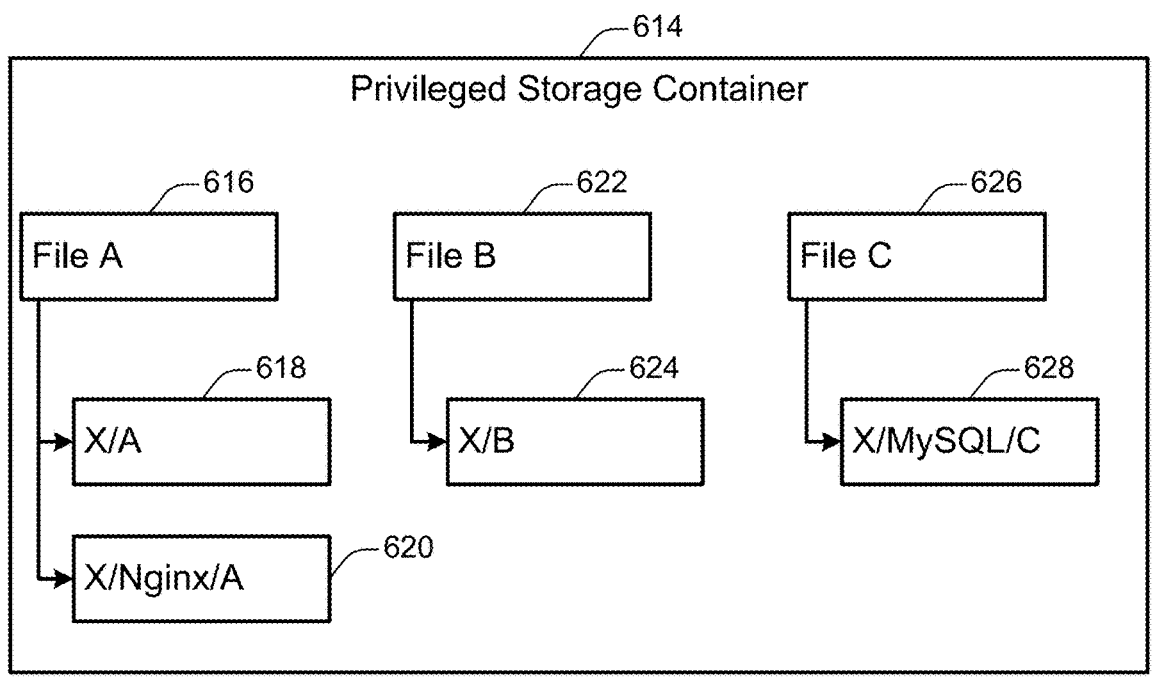

FIG. 6 illustrates an example of an arrangement of files in container applications. In particular, FIG. 6 illustrates an arrangement of files in a container application X 602 and in a privileged storage container 614. FIG. 6 illustrates a simple arrangement of a small number of files, layers, and storage containers for the purpose of illustration. However, in practice container applications may include different numbers, levels, arrangements, and types of layers and various numbers, arrangements, and types of files.

The container application X 602 includes base layer 604, MySQL layer 606, and Nginx layer 608. The base layer 604 includes files A 610 and B 612. The MySQL layer 606 includes the file C 614. The Nginx layer 608 includes the file B 616.

The privileged storage container 614 includes objects for file A 616, file B 622, and file C 626. File A is associated with snapshot X/A 618 and snapshot X/Nginx/A 620. File B is associated with snapshot X/B 624. File C is associated with snapshot X/MySQL/C 628.

According to various embodiments, the container application X 602 may be loaded into memory for execution. When the container application X is loaded, the image layer storage driver may begin by loading the base layer 604, which includes two files. The image layer storage driver then may load additional layers, such as the MySQL layer 606. The MySQL layer 606 may be loaded with all of the files included in the base layer (e.g., file A 610 and file B 612) in addition to the files in the MySQL layer 606 (e.g., file C 614).

According to various embodiments, a focal layer may be loaded into memory by creating a new inode associated with each file loaded for the focal layer. However, data associated with files in lower layers need not be copied. Instead, a snapshot of any modifications to data in lower layers made by the focal layer may be created. Snapshots may be managed by a privileged storage container such as the privileged storage container 614. An example of a method for loading a container application into memory is discussed with respect to FIG. 7.

According to various embodiments, once an application layer is loaded into memory, a file associated with the application layer may be modified by modifying a snapshot of the file rather than copying the entire file. For example, the file A 610 present in the base layer 604 may be modified by the Nginx layer 608 to create the file A 616. An example of a method for writing to a file is discussed with respect to FIG. 8.

According to various embodiments, the privileged storage container may manage the interaction between the container application 602 and one or more storage resources, as discussed throughout this application. Thus, the files shown within the privileged storage container 614 in FIG. 6 are not be physically included within the privileged storage container 614, but rather are readable and writeable through the privileged storage container 614.

According to various embodiments, the privileged storage container 614 may manage snapshots associated with files. A snapshot may include the entire contents of a file if that file is not present in a lower-level layer. If a file is present in a lower-level layer, a snapshot may include the portions of the file that are different in the upper-level layer. These snapshots may be used by the chain image layer storage driver to construct an overlay of the files associated with a layer.

For example, loading the Nginx layer 608 into memory may involve first loading snapshots associated with the base layer (e.g., snapshot X/A 618 and snapshot X/B 624). Then, snapshots associated with the Nginx layer 608 may be loaded (e.g., X/Nginx/A 620). Because the file A is included in both the base layer 604 and the Nginx layer 608, the data associated with the snapshot of file A in the base layer 604 (i.e. X/A 618) is loaded first and the data associated with any changes to that file in the Nginx layer 608 (i.e. X/Nginx/A 620).

Figure 7:
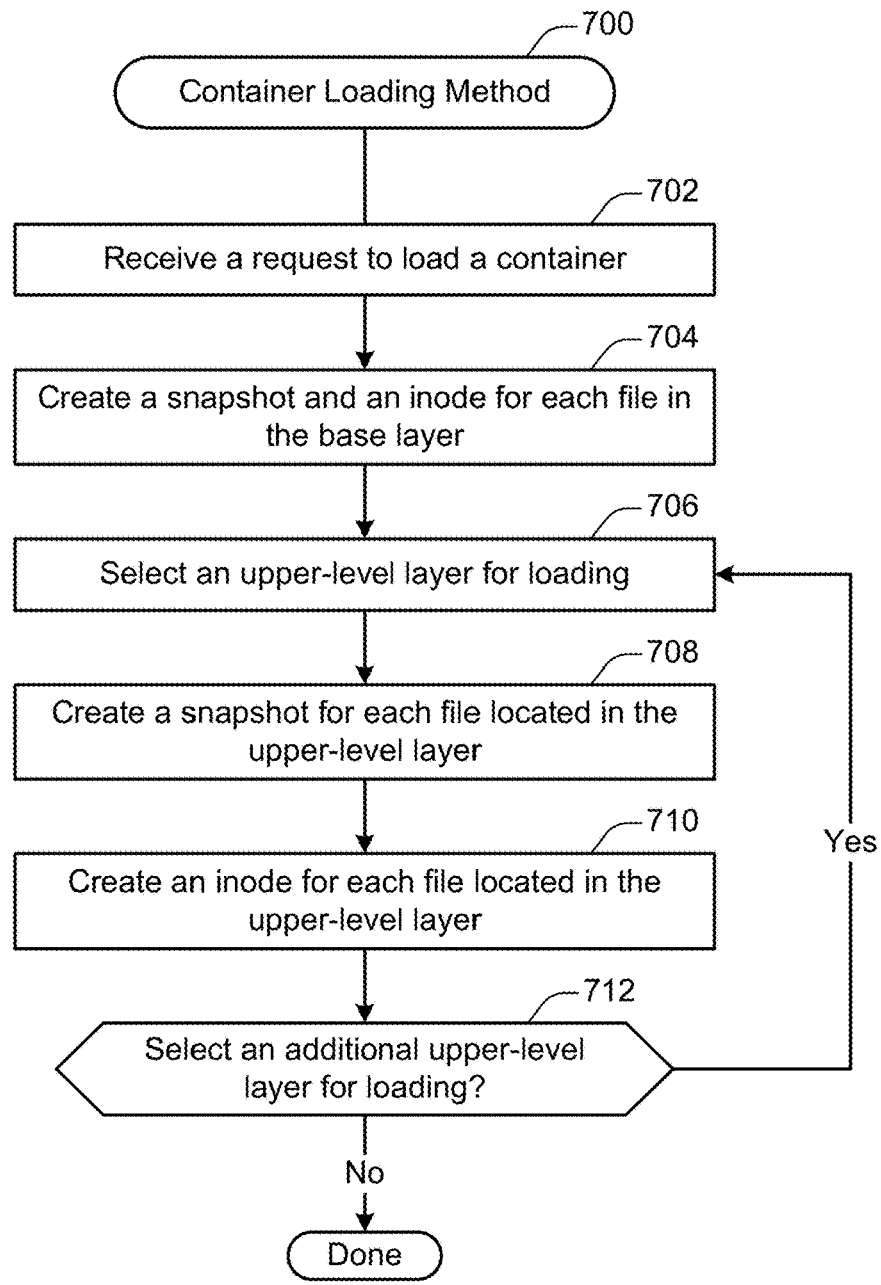
FIG. 7 illustrates an example of a method for loading a container application.

FIG. 7 illustrates an example of a method 700 for loading a container application. The method 700 may be performed in order to create load into working memory any files located on disk that are necessary for executing the container application.

At 702, a request is received to load a container. According to various embodiments, the request may be received when a container engine is initialized, when a new container is added to a container engine that is already running, when a running container is restarted, or at any other suitable time.

At 704, a snapshot and an inode are created for each file in the base layer of the container. According to various embodiments, the base layer of a container may include files usable by upper-level layers or by the base layer itself. For example, the base layer of a container may be a version of an operating system such as Linux. As another example, the base layer of a container may include programming language libraries such as Python modules that are used by upper-level layers.

In some implementations, an inode may be created for each file in the base layer. An inode is a data structure used to represent a filesystem object such as a file or a directory. The inode stores the attributes and locations for the object's data. For example, the inode may store information for accessing a snapshot associated with the object.

In some implementations, a snapshot may be created for each file in the base layer. A snapshot may be a block-level representation of the object in a privileged storage container such as the privileged storage container 614 shown in FIG. 6. As discussed with respect to FIG. 6, the privileged storage container may act as an abstraction layer between the container application and storage resources such as one or more physical disks. Accordingly, a snapshot in the privileged storage container may include information for where data blocks associated with the file are located on disk.

At 706, an upper-level layer is selected for loading. According to various embodiments, an upper-level layer may be any layer in the container application that is located at a level above the base layer. Upper-level layers may be selected for loading according to ordering information. For example, the level immediately above the base layer may include one or more layers, such as the MySQL layer 606 and the Nginx layer 608 shown in FIG. 6. Layers may be loaded level-by-level, so that no layer is loaded unless all layers beneath it have already been loaded.

At 708, a snapshot is created for each file located only in a lower-level layer. According to various embodiments, the creation of a snapshot at operation 708 may be substantially similar to operation 704. In particular embodiments, the characteristics of the snapshot may depend on whether or not the file is also located in a lower-level layer such as the base layer. If the file is not located in a lower-level layer, then the snapshot may include all of the data blocks associated with the file. If instead the file is located in a lower-level layer in addition to the upper-level layer, then the snapshot may include only those data blocks that are different in the upper-level layer when compared with the lower-level layer. The snapshot of the file in the upper-level layer may then be overlain on the snapshot of the file in the lower-level layer to provide a unified data source for the file in the upper-level layer.

In some implementations, a snapshot in the upper-level layer is not created if the same file with identical data is also located in a lower-level layer. Alternately, an empty snapshot without substantive data blocks may be created.

At 710, an inode is created for each file in the upper-level layer. According to various embodiments, the creation of a snapshot and an inode at operation 710 may be substantially similar to operation 704. In particular embodiments, a new inode may be created only when the file located in the upper-level layer is either new (i.e. not located in a lower-level layer) or modifies a file located in a lower-level layer. That is, in particular embodiments a new inode is not created if a file located in an upper-level layer is an exact copy of a file located in a lower-level layer.

At 712, a determination is made as to whether to select an additional upper-level layer for loading. According to various embodiments, layers may continue to be selected for loading until all layers in the container have been loaded.

Figure 8:
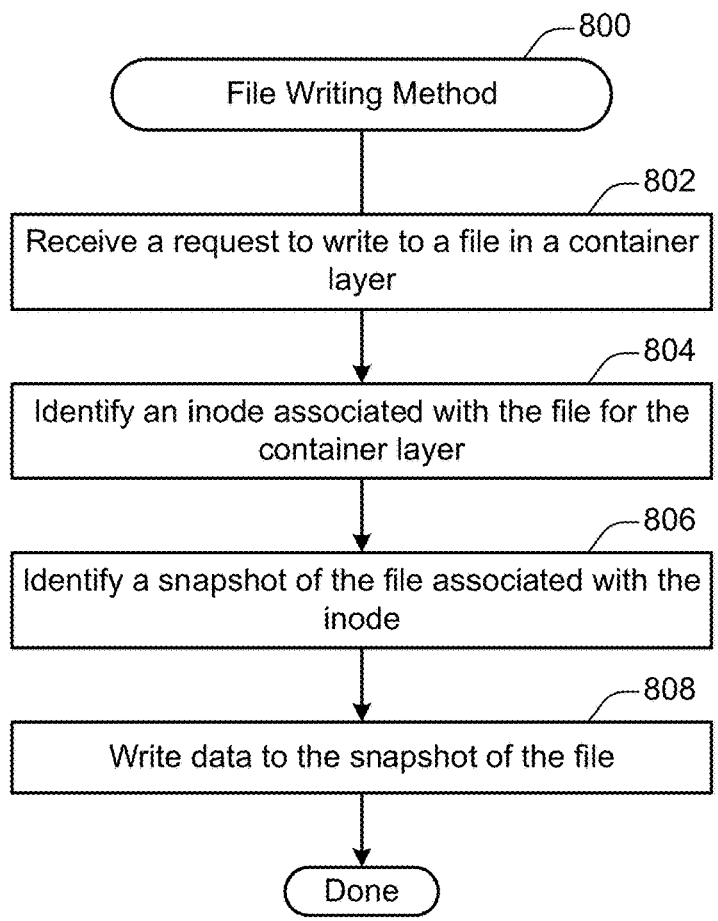
FIG. 8 illustrates an example of a method for writing to a file in a container application.

FIG. 8 illustrates an example of a method 800 for writing to a file in a container application. According to various embodiments, the method 800 may be performed by an application container in communication with a privileged storage container.

At 802, a request is received to write to a file in a container layer. For example, the container application X 602 shown in FIG. 2 may receive a request from the Nginx layer 608 to write to file A 616. The container layer may generate the request as part of its operations. For example, the request may be generated as part of an operation to store a log file to disk.

At 804, an inode associated with the file for the container layer is identified. According to various embodiments, each file in the container layer or in lower-level layers may be assigned an inode when the container layer is loaded into memory. The inode may identify a snapshot of the file for the container layer and may be specific to the container layer.

At 806, a snapshot of the file associated with the inode is identified. According to various embodiments, the snapshot may be identified from the inode. For example, the inode may identify the snapshot as an object accessible via the privileged storage container. For instance, the inode associated with the file A 616 may identify the snapshot X/Nginx/A 620 shown in FIG. 6.

At 808, data is written to the snapshot of the file. According to various embodiments, writing data to the snapshot of the file may involve communicating with a privileged storage container. An example of a method of writing data to a file is discussed with respect to FIG. 3.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
receiving a request to modify a designated file included in a containerized application that is loaded into a memory module on a computing device and being executed by a processor at the computing device, the containerized application including instructions arranged in a plurality of layers, the layers being ordered from lowest to highest, each layer including a respective plurality of files, the designated file included in more than one of the layers;
identifying a file snapshot corresponding to the designated file, the file snapshot including one or more file snapshot data blocks, each of the file snapshot data blocks including data that is additional to or different than any data associated with the designated file in a lower level layer; and
modifying the file snapshot instead of copying the entire designated file.

2. The method recited in claim 1, the method further comprising:
loading each layer into memory.

3. The method recited in claim 2, wherein loading a designated layer into memory includes creating a respective file snapshot and a respective file inode number for one or more files in the designated layer.

4. The method recited in claim 3, wherein the one or more files for which a respective file snapshot and a respective file inode number are created include each file in the designated layer that is not present in a lower level layer.

5. The method recited in claim 3, wherein the one or more files for which a respective file snapshot and a respective file inode number are created include each file in the designated layer that is present in a lower level layer but modified by the designated layer.

6. The method recited in claim 2, wherein the layers are loaded into memory in order from lowest to highest.

7. The method recited in claim 1, wherein the layers include a first layer and a second layer at the same level.

8. A system comprising:
a processor; and
memory, the memory storing instructions to execute a method, the method comprising:
receiving a request to modify a designated file included in a containerized application that is loaded into a memory module on a computing device and being executed by a processor at the computing device, the containerized application including instructions arranged in a plurality of layers, the layers being ordered from lowest to highest, each layer including a respective plurality of files, the designated file included in more than one of the layers;
identifying a file snapshot corresponding to the designated file, the file snapshot including one or more file snapshot data blocks, each of the file snapshot data blocks including data that is additional to or different than any data associated with the designated file in a lower level layer; and
modifying the file snapshot instead of copying the entire designated file.

9. The system recited in claim 8, the method further comprising:
loading each layer into memory.

10. The system recited in claim 9, wherein loading a designated layer into memory includes creating a respective file snapshot and a respective file inode number for one or more files in the designated layer.

11. The system recited in claim 10, wherein the one or more files for which a respective file snapshot and a respective file inode number are created include each file in the designated layer that is not present in a lower level layer.

12. The system recited in claim 10, wherein the one or more files for which a respective file snapshot and a respective file inode number are created include each file in the designated layer that is present in a lower level layer but modified by the designated layer.

13. The system recited in claim 9, wherein the layers are loaded into memory in order from lowest to highest.

14. The system recited in claim 8, wherein the layers include a first layer and a second layer at the same level.

15. One or more non-transitory computer readable media having instructions stored thereon for performing a method, the method comprising:
receiving a request to modify a designated file included in a containerized application that is loaded into a memory module on a computing device and being executed by a processor at the computing device, the containerized application including instructions arranged in a plurality of layers, the layers being ordered from lowest to highest, each layer including a respective plurality of files, the designated file included in more than one of the layers;
identifying a file snapshot corresponding to the designated file, the file snapshot including one or more file snapshot data blocks, each of the file snapshot data blocks including data that is additional to or different than any data associated with the designated file in a lower level layer; and
modifying the file snapshot instead of copying the entire designated file.

16. The one or more non-transitory computer readable media recited in claim 15, wherein the method further comprises:
loading each layer into memory.

17. The one or more non-transitory computer readable media recited in claim 16, wherein loading a designated layer into memory includes creating a respective file snapshot and a respective file inode number for one or more files in the designated layer.

18. The one or more non-transitory computer readable media recited in claim 17, wherein the one or more files for which a respective file snapshot and a respective file inode number are created include each file in the designated layer that is not present in a lower level layer.

19. The one or more non-transitory computer readable media recited in claim 17, wherein the one or more files for which a respective file snapshot and a respective file inode number are created include each file in the designated layer that is present in a lower level layer but modified by the designated layer.

20. The one or more non-transitory computer readable media recited in claim 16, wherein the layers are loaded into memory in order from lowest to highest.

* * * * *